United States Patent
Cirkic et al.

(10) Patent No.: US 11,451,988 B2
(45) Date of Patent: Sep. 20, 2022

(54) METHODS AND APPARATUS FOR ASSIGNMENT OF RADIO RESOURCES IN A WIRELESS NETWORK

(71) Applicant: Telefonaktiebolaget LM Ericsson (publ), Stockholm (SE)

(72) Inventors: Mirsad Cirkic, Linköping (SE); Jonas Fröberg Olsson, Ljungsbro (SE); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 168 days.

(21) Appl. No.: 16/337,975

(22) PCT Filed: Oct. 14, 2016

(86) PCT No.: PCT/SE2016/050997
§ 371 (c)(1),
(2) Date: Mar. 29, 2019

(87) PCT Pub. No.: WO2018/070909
PCT Pub. Date: Apr. 19, 2018

(65) Prior Publication Data
US 2020/0029234 A1    Jan. 23, 2020

(51) Int. Cl.
*H04B 17/309* (2015.01)
*H04W 24/10* (2009.01)

(52) U.S. Cl.
CPC .......... *H04W 24/10* (2013.01); *H04B 17/309* (2015.01)

(58) Field of Classification Search
CPC ...... H04W 24/10; H04B 17/309; H04L 5/005; H04L 5/0091; H04L 1/00
See application file for complete search history.

(56) References Cited

U.S. PATENT DOCUMENTS

| | | | |
|---|---|---|---|
| 2008/0090583 A1* | 4/2008 | Wang | H04W 72/121 714/751 |
| 2013/0196675 A1 | 8/2013 | Xiao et al. | |

(Continued)

FOREIGN PATENT DOCUMENTS

| | | |
|---|---|---|
| CN | 103313391 A | 9/2013 |
| CN | 104038312 A | 9/2014 |

(Continued)

OTHER PUBLICATIONS

First Examination Report dated Aug. 6, 2020 for Indian Patent Application No. 201917009629, 6 pages.

(Continued)

*Primary Examiner* — Edan Orgad
*Assistant Examiner* — Malick A Sohrab
(74) *Attorney, Agent, or Firm* — Sage Patent Group

(57) ABSTRACT

A network node (200), a wireless device (202) and methods therein, for indicating and handling assignment of measurement resources in a predefined region of a resource block transmitted by the network node (200). The network node (200) identifies (2:1) a wireless device (202) that is required to perform measurements on signals transmitted by the network node (200) and/or measurements of interference. The network node (200) then assigns (2:2) to the wireless device (202) usage of the measurement resources in the predefined region, and signals (2:3) an indication of the assigned usage of the measurement resources to the wireless device (202). The wireless device (202) is then able to determine and use (2:4) the measurement resources based on the received indication. Thereby, the usage of the measurement resources can be assigned in a dynamic and flexible manner, e.g. depending on the current need for measurement resources.

16 Claims, 6 Drawing Sheets

(56) References Cited

U.S. PATENT DOCUMENTS

| | | | |
|---|---|---|---|
| 2015/0280878 A1 | 10/2015 | Lee et al. | |
| 2016/0227548 A1* | 8/2016 | Nimbalker | H04W 72/042 |
| 2016/0301505 A1* | 10/2016 | Furuskog | H04L 27/2602 |
| 2019/0089436 A1* | 3/2019 | Wei | H04L 5/0057 |
| 2019/0386730 A1* | 12/2019 | Xiao | H04L 5/0053 |

FOREIGN PATENT DOCUMENTS

| | | | | |
|---|---|---|---|---|
| CN | 104081813 A | 10/2014 | | |
| CN | 104885506 A | 9/2015 | | |
| CN | 105723640 A | 6/2016 | | |
| EP | 2966931 A1 * | 1/2016 | | H04L 5/0048 |
| EP | 2966931 A1 | 1/2016 | | |
| JP | 2007336421 A | 12/2007 | | |

OTHER PUBLICATIONS

Unknown, Author, "ePDCCH search space design", NEC Group, 3GPP TSG RAN WG1 Meeting #69, R1-122595, Prague, Czech Republic, May 21-25, 2012, 1-10.

Unknown, Author, "PRB indication to UE for ePDCCH transmission", 3GPP TSG RAN WG1 Meeting #70, R1-123252, Qingdao, China, Aug. 13-17, 2012, 1-12.

First Chinese Office Action for Chinese Patent Application No. CN 201680089991.2 dated May 28, 2021, 13 pages.

Chinese Notification to Grant Patent Right for Chinese Patent Application No. CN 201680089991.2 dated Jan. 17, 2022, 6 pages.

\* cited by examiner

| 1: {87} | 2: {88} | 3: {89} | 4: {90} | 5: {91} | 6: {92} | 7: {93} | 8: {94} |
|---|---|---|---|---|---|---|---|
| 9: {99} | 10: {100} | 11: {101} | 12: {102} | 13: {103} | 14: {104} | 15: {105} | 16: {106} |

| Indicator | Entry |
|---|---|
| Number, n | 2 |
| Start, s | 4 |
| 1st end, e1 | 10 |
| 2nd end, e2 | 14 |

METHODS AND APPARATUS FOR ASSIGNMENT OF RADIO RESOURCES IN A WIRELESS NETWORK

TECHNICAL FIELD

The present disclosure relates generally to a network node, a wireless device, and methods therein, for indicating and handling assignment of radio resources in a wireless network.

BACKGROUND

In a wireless network comprising a plurality of network nodes, it is desirable to achieve high capacity and adequate performance in communication with wireless devices. The term "wireless network" is used in this description to denote any network comprising network nodes such as base stations, access points, eNodeBs or the like which are capable of radio communication with wireless devices, e.g. by transmitting data and control information as well as reference signals that can be detected and measured by the wireless devices for evaluation of connections and channels.

The nodes in the network that perform such radio communication with wireless devices are also generally denoted "network nodes" herein. Further, the term "wireless device" denotes any communication equipment that is capable of radio communication with network nodes in a wireless network. Some non-limiting examples of wireless devices that may be involved in the procedures described herein include mobile phones, smartphones, tablets, laptop computers and Machine-to-Machine, M2M, devices such as sensors and actuators. Throughout this description, the term "User Equipment", UE, may also be used instead of wireless device.

In order to evaluate whether a connection to a network node is suitable for communication and to configure various parameters for the communication, the wireless devices are required to perform measurements on predefined reference signals which are regularly transmitted from the network nodes, and to send measurement reports to a serving network node, also referred to as Channel State Information, CSI, feedback. In a wireless network operating according to Long Term Evolution, LTE, as defined by the third Generation Partnership Project, 3GPP, signals are transmitted by the network nodes using Orthogonal Frequency-Division Multiplexing, OFDM, which is a method of encoding digital data on multiple carrier frequencies. In this description the reference signals will sometimes be referred to as "Cell-specific Reference Signals", CRSs, which term is commonly used in LTE, although this description is not limited to using CRSs as reference signals.

In many wireless networks of today, the CSI feedback is useful for obtaining satisfactory performance in the wireless communication between wireless devices and network nodes in the network. As mentioned above, reference signals are transmitted which are used by the wireless devices to estimate the channel state, whereupon the reported CSI feedback typically includes values of a Channel-Quality Indicator, CQI, and a Rank Indicator, RI. More detailed reports may include values of a frequency-selective CQI and/or a Pre-coding Matrix Indicator, PMI.

LTE networks support CSI-reporting schemes where the reference signals are transmitted periodically where the CRSs are typically sent every subframe while user-specific reference signals for CSI measurements, referred to as CSI-RSs, can be sent with a varying periodicity, e.g. more seldom than the CRSs. Wireless devices using transmission mode 10, TM10, rely solely on CSI-RS resources while other wireless devices typically use the CRS at least for interference measurements.

TM10 wireless devices can be configured to report CSI for multiple CSI-processes, which each may have different CSI-measurement resources. A CSI-measurement resource, CSI-MR, includes a CSI Reference Symbol, CSI-RS, resource and a CSI Interference Measurement CSI-IM, resource, which are specified per CSI-process. Both the CSI-RS and the CSI-IM resources are divided into sets of resources, where each set is identified by a CSI-RS configuration index. Each CSI-RS configuration index contains resources in every Physical Resource Block, PRB, in the frequency band used. A subframe configuration specifies a subframe periodicity and a subframe offset that specify for the wireless devices at which time instances the respective measurement resources are available.

However, it is a problem that radio resources are conventionally allocated for measurements on RS in a static or semi-static manner. For a large number of active wireless devices, also referred to as "users" for short, many resources are required to carry user-specific RSs. The need for such RSs may vary, both for different users and over time, and the static or semi-static allocation of measurement resources may be either insufficient or too extensive. In some cases, many users are in need of RSs for measurements and in other cases, few users need to measure the RSs.

To change a semi-static configuration is both slow and requires much overhead signalling. However, if the configurations are not updated for users with reduced need for RS, e.g. when their reported CSI remains up-to-date, radio resources might be wasted by too extensive RS allocation. Conversely, if a user is in greater need of RS and the semi-static configuration is not changed, the achieved performance would be unnecessarily poor due to insufficient opportunities for RS measurements and outdated and irrelevant CSI reports as a result.

SUMMARY

It is an object of embodiments described herein to address at least some of the problems and issues outlined above. It is possible to achieve this object and others by using a network node, a wireless device, and methods therein as defined in the attached independent claims.

According to one aspect, a method is performed by a network node for indicating assignment of measurement resources in a predefined region of a resource block transmitted by the network node. In this method the network node identifies at least one wireless device that is required to perform measurements on signals transmitted by the network node and/or measurements of interference. The network node then assigns to the at least one identified wireless device usage of the measurement resources in the predefined region, and signals an indication of the assigned usage of the measurement resources to the at least one wireless device. The signalled indication specifies how the respective measurement resources should be used by the at least one wireless device.

According to another aspect, a network node is arranged to indicate assignment of measurement resources in a predefined region of a resource block transmitted by the network node. The network node is configured to identify at least one wireless device that is required to perform measurements on signals transmitted by the network node and/or measurements of interference. This functionality may be realized by means of an identifying module in the network node. The network node is also configured to assign to the at least one identified wireless device usage of the measurement resources in the predefined region, which may be realized by means of an assigning module in the network node.

The network node is further configured to signal an indication of the assigned usage of the measurement resources to the at least one wireless device, said indication specifying how the respective measurement resources should be used by the at least one wireless device. This functionality may be realized by means of a signalling module in the network node.

According to another aspect, a method is performed by a wireless device for handling assignment of measurement resources in a predefined region of a resource block transmitted by a network node in a wireless network. In this method, the wireless device receives from the network node an indication of usage of measurement resources in the predefined region, said indication specifying how the respective measurement resources should be used by the wireless device. The wireless device then determines the measurement resources based on the received indication, and uses the determined measurement resources as specified by the received indication of usage.

According to another aspect, a wireless device is arranged to handle assignment of measurement resources in a predefined region of a resource block transmitted by a network node in a wireless network. The wireless device is configured to receive from the network node an indication of usage of measurement resources in the predefined region, said indication specifying how the respective measurement resources should be used by the wireless device. This functionality may be realized by means of a receiving module in the wireless device.

The wireless device is further configured to determine the measurement resources based on the received indication, and to use the determined measurement resources as specified by the received indication of usage. These functionalities may be realized by means of a determining module and a using module, respectively, in the wireless device.

Advantages that may be achieved when employing the above methods, network node and wireless device include that usage of measurement resources can be assigned in a dynamic and flexible manner, e.g. depending on the current need for measurement resources, which enables better performance and resource utilization in the network. Also, no extensive resource-consuming signalling from the network node to the wireless device will be required, and the impact on processing operations in either of the network node and the wireless device will be limited.

The above methods, network node and wireless device may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable usage of measurement resources in a flexible and dynamic manner without requiring extensive signalling from network nodes to wireless devices, which can be achieved by procedures and functionality in a network node and a wireless device, for indicating and handling assignment of measurement resources in a predefined region of a resource block transmitted by a network node.

Figure 1:
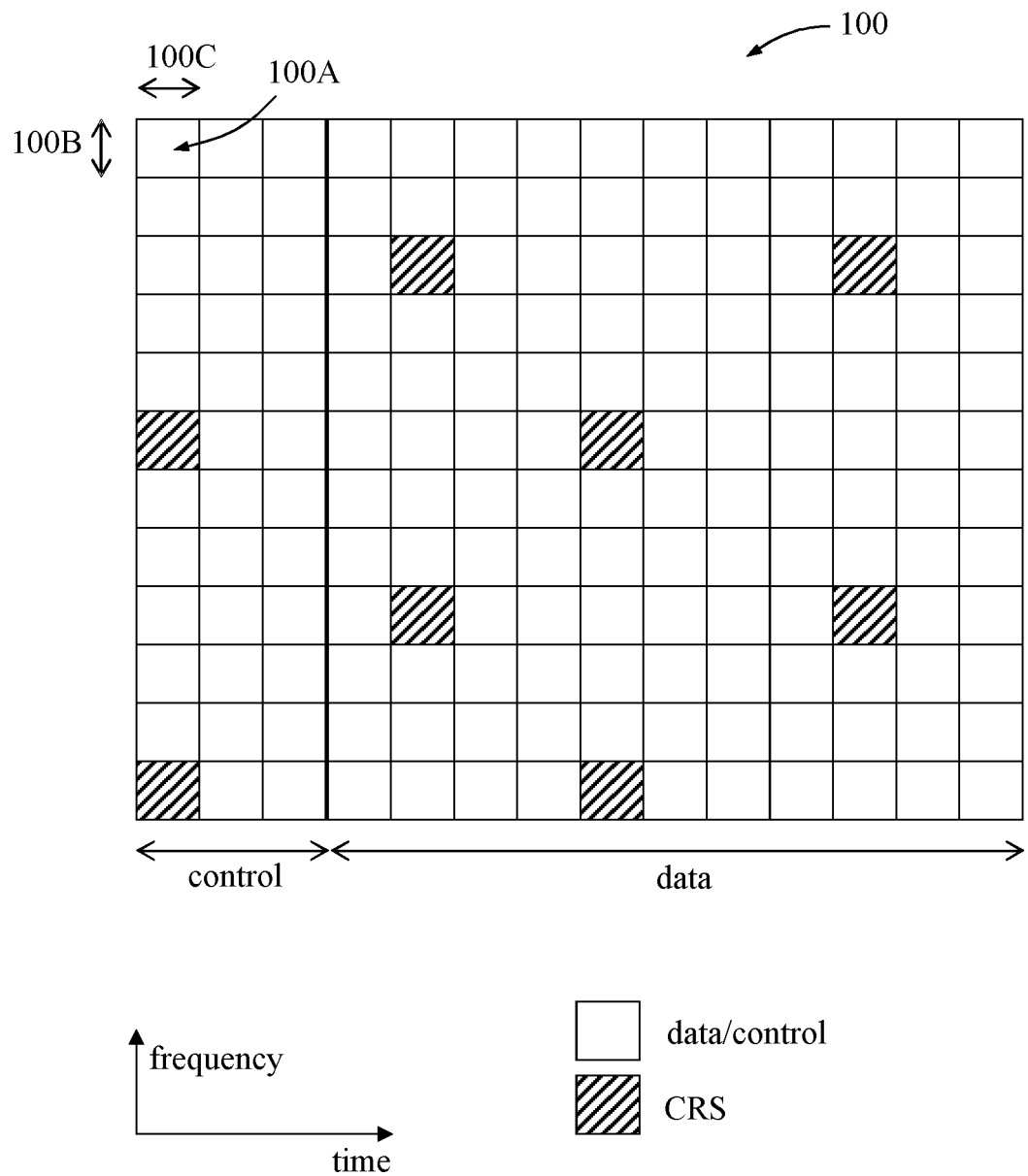
FIG. 1 illustrates an example downlink resource block with resource elements carrying reference signals in predefined positions, according to the prior art.

For downlink transmission, various information and signals can be organized in a "resource block" of which an example is illustrated in FIG. 1. A downlink transmission may comprise multiple parallel resource blocks which can be arranged in the frequency domain in a "stacked" manner across an available frequency bandwidth. In other words, the total available frequency bandwidth can be divided into a set of resource blocks which are thus separated in the frequency domain. As an example, one resource block 100 may extend over 180 kHz during 1 millisecond, ms, and may further be divided into 12 subcarriers in the frequency domain and 14 OFDM symbols in the time domain, as shown in FIG. 1. The scheduling block 100 in FIG. 1 is thus effectively a "resource grid" divided into 12 elements in the frequency domain representing the subcarriers and 14 elements in the time domain representing the OFDM symbols.

The smallest resource in the resource block 100 is comprised of one Resource Element, RE, 100A which corresponds to one subcarrier 100B during one OFDM symbol 100C. The resource block 100 in this example is thus comprised of 12×14 REs. Some predefined resource elements in preset positions in this time/frequency grid can be used for transmitting CRSs which are indicated in FIG. 1 as striped resource elements, while the resource elements used for data and control are shown to be non-striped. A predetermined sequence of CRSs thus occur in predefined RE positions which are known to the wireless devices. The term "resource block" is used herein to represent a set of resource elements in which reference signals, data and/or control can be transmitted.

Figure 2:
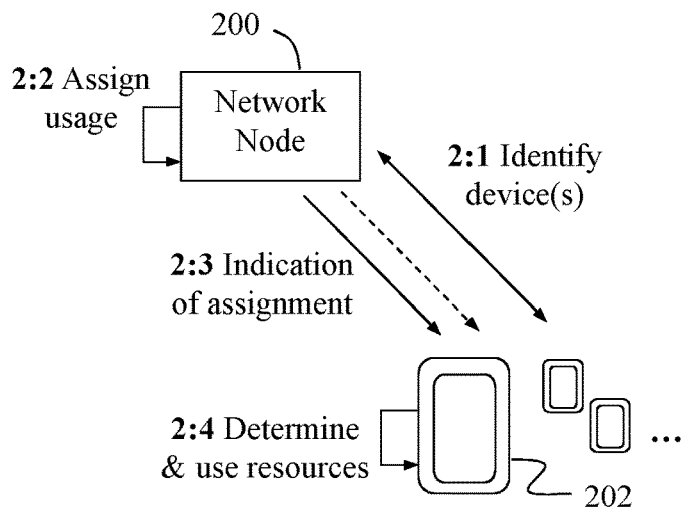
FIG. 2 is a communication scenario illustrating an example of how the solution may be employed, according to some possible embodiments.

An example of a communication scenario where the solution and its embodiments can be used, is illustrated in FIG. 2 involving a network node 200 of a wireless network and a wireless device 202, the latter representing any number of wireless devices that may participate in the manner described here for device 202. The wireless device 202 may be served by the network node 200, e.g. either in idle mode or in connected mode and the solution is not limited in this respect. When the wireless device 202 is in idle mode, i.e. not involved in any data communication, the solution may be applied during "wakeup periods" when the idle and "sleeping" device wakes up and monitors control messages from the network node 200. A first action 2:1 illustrates that the network node 200 identifies one or more wireless devices, represented by device 202, that are required to perform measurements on signals transmitted by the network node 200 and/or measurements of interference. Thereby, the network node 200 can assess how much need there is for making measurements by the identified wireless device(s) 202, and the network node 200 can assign usage of measurement resources accordingly.

The network node 200 then assigns to the wireless device(s) 202 usage of the measurement resources in the predefined region in an action 2:2, and signals an indication of the assigned usage of the measurement resources to the wireless device(s) 202 in another action 2:3. Various examples of how this assignment may be indicated in an efficient way will be described later below. Each wireless device 202 is then able to determine and use the measurement resources based on the received indication, as shown in an action 2:4. Thereby, the usage of the measurement resources can be assigned in a dynamic and flexible manner, e.g. depending on the current need for measurement resources. It should be noted that the assignment of resource usage and signalling of the indication may be done dynamically such that the resource usage assignment can be valid for a limited number of transmitted resource blocks, even for just a single resource block, and the assignment may thus be changed on a per resource block basis depending on the identified wireless device(s) 202. In this context, the term "dynamically" indicates that the assignment has a certain time-validity, e.g. the assigned measurement resource usage may be valid for a single measurement to be performed.

The solution disclosed herein may thus be realized by functionality in a network node and functionality in a wireless device, which will now be described in more detail by referring to the flow charts in FIGS. 3 and 4, respectively. An example procedure will first be described with reference to the flow chart in FIG. 3, of how the solution may be employed in terms of actions performed by a network node in a wireless network, such as the above-described network node 200, for indicating assignment of measurement resources in a predefined region of a resource block transmitted by the network node 200. Reference will sometimes also be made, without limiting the features described, to the example shown in FIG. 2. The procedure illustrated by FIG. 3 can thus be used to accomplish the operation of network node 200 described above.

The above-mentioned predefined region of a resource block is a region or area in the resource block where measurement resources can occur. The predefined region has been preconfigured in a suitable manner, and it is thereby known to each wireless device 202 which may have acquired this knowledge e.g. when the device 202 is activated and registered in the network, and/or by receiving a control message from the network. This control message may have been conveyed to the devices, e.g., in broadcasted system information or in so-called "higher layer" control signalling, and the solution is not limited in this respect.

Further, the device 202 may have received the control message from the network node 200 or from another network node, not shown, to which the device was previously connected. It is thus assumed that each device 202 in this procedure knows the predefined region of the resource block, regardless of how this knowledge has been acquired.

It can also be said that the predefined region is "semi-statically" configured in the sense that it may be valid for a period of time, e.g. until a new predefined region is signalled to the wireless device(s) 200. For example, the wireless device(s) 200 may be semi-statically configured with a predefined table or the like containing resource elements of the predefined region that might potentially be used as measurement resources. Further, as also mentioned above, a resource block in this description represents a set of resource elements in which reference signals, data and/or control can be transmitted. In practice, the predefined region discussed herein may extend across one or more Physical Resource Blocks, PRBs, depending on the implementation.

the assignment of usage of the measurement resources in the predefined region may sometimes coincide with the assignment of data. Then, a resource block bitmap for the resource blocks used for measurement resources may not be explicitly indicated in the assignment. For example, the resource block bitmap may be explicitly indicated or it may implicitly coincide with a resource block bitmap of the pre-defined region.

A first action 300 illustrates that the network node 200 identifies at least one wireless device 202 that is required to perform measurements on signals transmitted by the network node 200 and/or measurements of interference, which corresponds to action 2:1 above. The network node 200 can thereby adapt the usage of measurement resources to the current need for the device(s) to make different measurements. In a next action 302, the network node 200 accordingly assigns to the at least one identified wireless device 202 usage of the measurement resources in the predefined region, which corresponds to action 2:2 above. Some examples of how this assignment may be made will be mentioned later below with reference to FIGS. 5A-E.

the network node 200 then signals an indication of the assigned usage of the measurement resources to the at least one wireless device 202, in another action 304 which corresponds to action 2:3 above. The signalled indication specifies how the respective measurement resources should be used by the at least one wireless device 202. Some examples of how this indication may be formed or constructed will be described later below with reference to FIGS. 6A-D. A further action 306 illustrates that the network node 200 may transmit the resource block according to the resource assignment made in action 302.

Various embodiments that may be employed in the above procedure will now be outlined. In some example embodiments, the signalled indication may specify that each respective measurement resource should be used for either of: channel estimation, interference estimation, data and zero-power. A measurement resource indicated for channel estimation will thus contain a reference signal that can be measured by the wireless device(s) 202.

A measurement resource indicated for interference estimation will contain no data or reference signal directed to the wireless device(s) 202 so that interference from other transmissions can be measured by the wireless device(s) 202. For example, a measurement resource for interference measurement may contain a reference signal sent by the network and directed to the wireless device. In this case the wireless device shall not assume data on that resource. A measurement resource indicated for data will contain data directed to the wireless device(s) 202. A measurement resource indicated for zero-power will contain no transmit power at all, at least not directed to the wireless device(s) 202, also referred to as "blanked". The wireless device(s) shall thus not assume data on that resource either.

In another example embodiment, the signalled indication may comprise a mapping to individual resource elements in the predefined region, e.g. by referring to a predefined mapping table or the like. In further example embodiments, when a first part of the predefined region is assigned for data by predefined default, and a second part of the predefined region is zero-power by predefined default, the indication may indicate measurement resources partly covering both the first and second parts so that the remaining resources in the first and second parts are used according to said default. In this context, "predefined default" means that the respective parts have been pre-configured accordingly, e.g., semi-statically.

In another example embodiment, the signalled indication may refer to entries in a predefined table where each entry is associated to one or more respective resource elements in the predefined region. An entry in the table may thus refer to a single resource element or to a set of resource elements in the predefined region. An example of such a table will be described later below with reference to FIG. 6B.

When using a predefined table according to the above embodiment, another example embodiment may be that the indication indicates a start entry "s" in the table where the measurement resources start to occur in the predefined region, and a preconfigured or signalled number "n" of subsequent entries in the table could be used for the measurement resources. For example, if n is 2 and the start entry s in the table is resource element 10, the wireless device(s) 202 would know that the measurement resources will occur in resource elements 10 and 11 in the predefined region.

If the start entry s is indicated according to the above embodiment, another example embodiment could be that the indication further indicates a first end-entry "e1" in the table representing at least one last resource element in the predefined region where reference signals are transmitted, and a second end-entry "e2" in the table representing at least one last resource element in the predefined region where no data can be transmitted to the at least one wireless device 202. Thereby, the wireless device(s) 202 can deduce that interference measurements can be performed after the last measurement resource has occurred in entry s+n and up to the second end-entry e2. An example of how such indications of start and end-entries may be used will be described later below with reference to FIGS. 6A-D.

If the above start and end-entries are employed, another example embodiment could be that the first end-entry e1 may be indicated for a specific cell, e.g. served by the network node. All devices present in the cell can thus use the same first end-entry e1. Another example embodiment could be that the second end-entry e2 is indicated for a specific wireless device such that e2 can be set individually per device. It was further mentioned above that wireless devices may be configured to report Channel State Information, CSI, for multiple CSI-processes, where each CSI process may have its own CSI-measurement resources. Yet another example embodiment could be that the start entry s is indicated for a specific CSI process which enables the use of different start entries for different CSI-processes.

Figure 3:
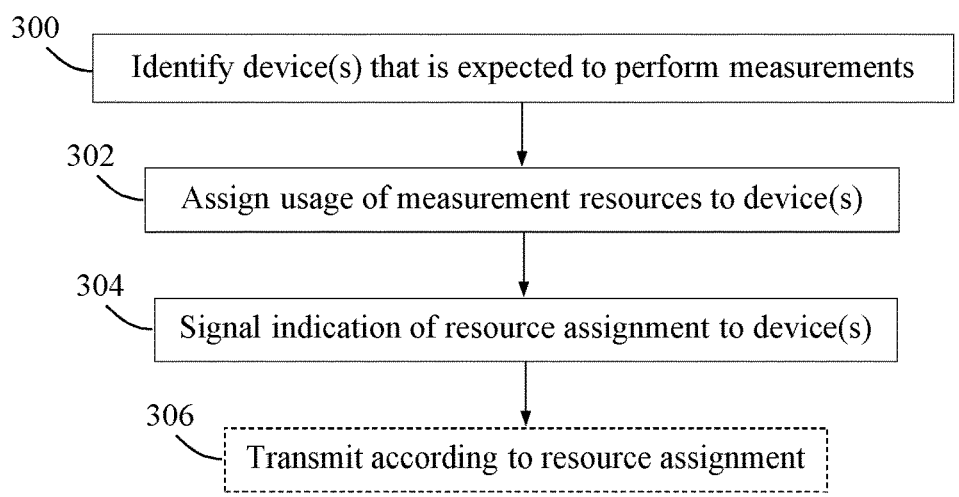
FIG. 3 is a flow chart illustrating a procedure in a network node, according to further possible embodiments.

In another example embodiment, the procedure of FIG. 3 could be performed for one or more CSI processes. Thus, the indication signalled in action 304 may be valid for a selected number of CSI processes. In yet another example embodiment, if multiple CSI processes are employed, the procedure of FIG. 3 could be performed for each CSI process so that the indication signalled in action 304 will be valid for a specific CSI process.

In another example embodiment, the indication may be signalled in a Downlink Control Information, DCI, message in action 304. If so, another example embodiment could be that the DCI message comprises a Radio Network Temporary Identifier, RNTI, which is associated to a group of wireless devices or to an individual wireless device. Thereby, the indication can be addressed to the wireless device or those wireless devices that correspond to the RNTI of the DCI message.

In another example embodiment, the assigned usage of the measurement resources to the at least one wireless device 202 may be changed, e.g. on a dynamic basis in case the radio conditions and/or the identified devices change. In that case, an indication of the changed assigned usage could be signalled from the network node 200 to the at least one wireless device 202. This embodiment may have the advantage of requiring less information bits to convey such a change, instead of signalling an entire new usage assignment.

In another example embodiment, said indication may further specify how many ports on which the measurement resources in the predefined region should be used by the at least one wireless device 202. An example of how this embodiment may be used will be mentioned later below. In further example embodiments, the measurement resources may be Channel State Information Measurement Resources, CSI-MRs, where each CSI-MR comprises a CSI Reference Symbol, CSI-RS, resource and a CSI Interference Measurement, CSI-IM, resource.

Another example procedure will now be described with reference to the flow chart in FIG. 4, of how the solution may be employed in terms of actions performed by a wireless device, such as the above-described wireless device 202, for handling assignment of measurement resources in a predefined region of a resource block transmitted by a network node in a wireless network, such as the network node 200. Reference will again also be made, without limiting the features described, to the example shown in FIG. 2. The procedure illustrated by FIG. 4 can thus be used to accomplish the operation of wireless device 202 described above.

A first action 400 illustrates that the wireless device 202 receives from the network node 200 an indication of usage of measurement resources in the predefined region, said indication specifying how the respective measurement resources should be used by the wireless device. This action corresponds to actions 2:3 and 304 above. In a next action 402, the wireless device 202 determines the measurement resources based on the received indication, which will be exemplified later below with reference to some possible embodiments. A final action 404 illustrates that the wireless device 202 uses the determined measurement resources as specified by the received indication of usage, i.e. when the resource block is transmitted by a network node. Actions 402 and 404 correspond to action 2:4 above.

Figure 4:
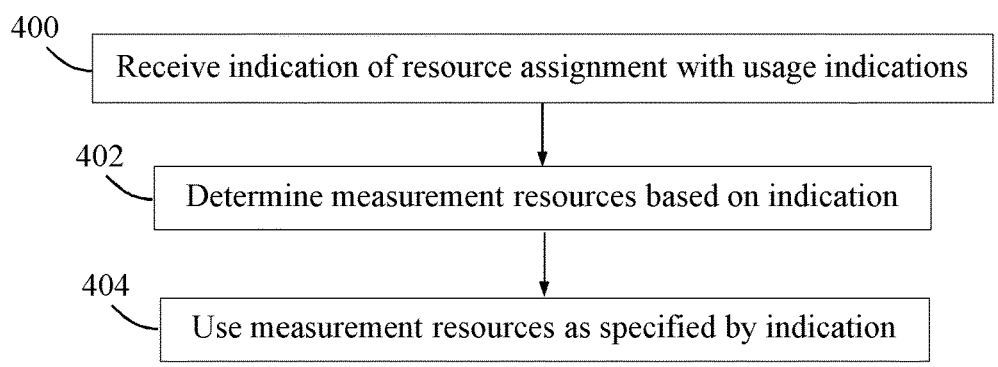
FIG. 4 is a flow chart illustrating a procedure in a wireless device, according to further possible embodiments.

The following embodiments of the device procedure in FIG. 4 largely correspond to at least some of the example embodiments described above for the network node procedure in FIG. 3. In an example embodiment, the received indication specifies that each respective measurement resource should be used for either of: channel estimation, interference estimation, data and zero-power. These usages have been described above. In another example embodiment, the received indication may comprise a mapping to individual resource elements in the predefined region.

In further example embodiments, when a first part of the predefined region is assigned for data by predefined default and a second part of the predefined region is zero-power by predefined default, the received indication may indicate measurement resources partly covering both the first and second parts. In this case the wireless device 202 may use the remaining resources in the first and second parts according to said default.

In another example embodiment, the received indication may refer to entries in a predefined table where each entry is associated to one or more respective resource elements in the predefined region. In that case, another example embodiment could be that the received indication indicates a start entry "s" in the table where the measurement resources start to occur in the predefined region, and the wireless device (202) may use a preconfigured or signalled number "n" of subsequent entries in the table for determining the measurement resources.

In further example embodiments, the received indication may further indicate a first end-entry "e1" in the table representing the last resource element in the predefined region where reference signals are transmitted, and a second end-entry "e2" in the table representing the last resource element in the predefined region where no data can be transmitted to the wireless device 202. In that case, the wireless device 202 may further use the first end-entry e1 and the second end-entry e2 for determining the measurement resources.

In another example embodiment, the wireless device 202 may perform the method for one or more CSI processes. In yet another example embodiment, if multiple CSI processes are employed, the wireless device 202 may perform the above actions 400-404 for each CSI process.

In another example embodiment, the wireless device 202 may receive said indication in a DCI message. In yet another example embodiment, the DCI message may comprise a Radio Network Temporary Identifier, RNTI, which is associated to the wireless device 202.

In another example embodiment, the wireless device 202 may further receive an indication indicating that the assigned usage of the measurement resources has been changed. In yet another example embodiment, the received indication may further specify a number of ports, and in that case the wireless device 202 may use the measurement resources in the predefined region on the specified number of ports.

Figure 5A:
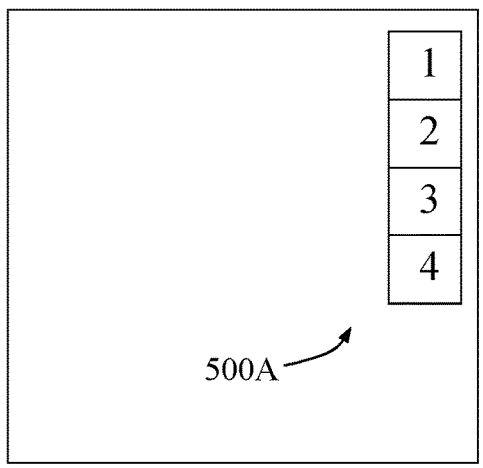
FIGS. 5A-5E are diagrams illustrating some examples of how measurement resources may be arranged in a predefined region of a resource block, according to further possible embodiments.
Figure 5B:
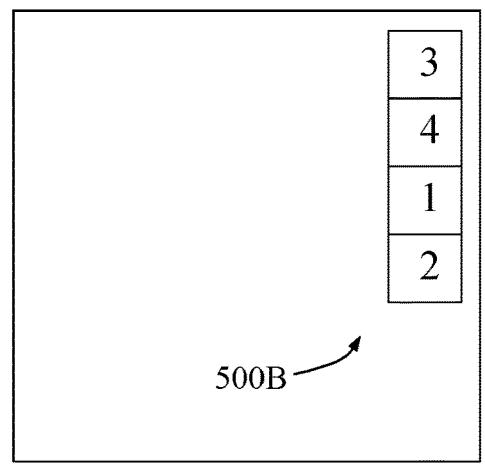
Figure 5C:
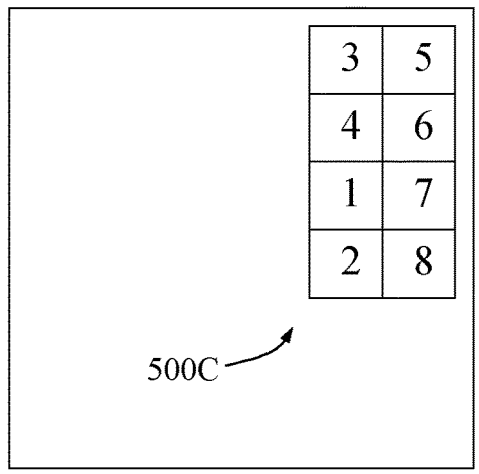
Figure 5D:
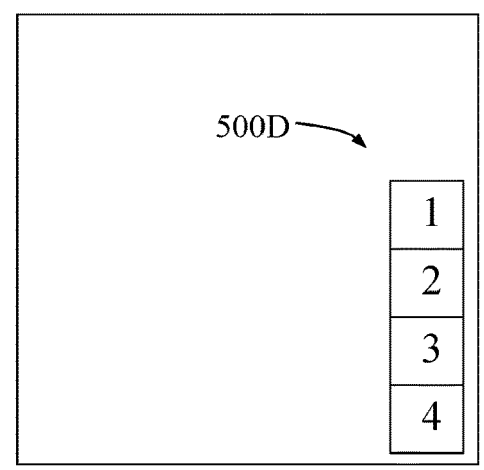

FIGS. 5A-D illustrate how the above-mentioned predefined region where measurement resources may potentially occur, could be arranged in a resource block and how resource elements therein could be denoted. In FIG. 5A, the predefined region 500A comprises four successive resource elements denoted 1, 2, 3 and 4. In FIG. 5B, the predefined region 500B comprises four successive resource elements which in this case are denoted 3, 4, 1 and 2. In FIG. 5C, the predefined region 500C comprises eight successive resource elements which in this case are arranged in two columns, a first column with resource elements denoted 3, 4, 1 and 2, and a second adjacent column with resource elements denoted 5, 6, 7 and 8. In FIG. 5D, the predefined region 500D comprises four successive resource elements denoted 1, 2, 3 and 4 like in FIG. 5A although the predefined region 500D is located differently in the resource block than the predefined region 500A of FIG. 5A.

Figure 5E:
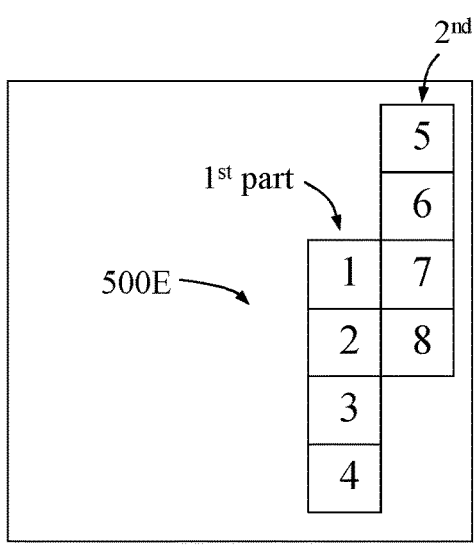
Figure 5E:
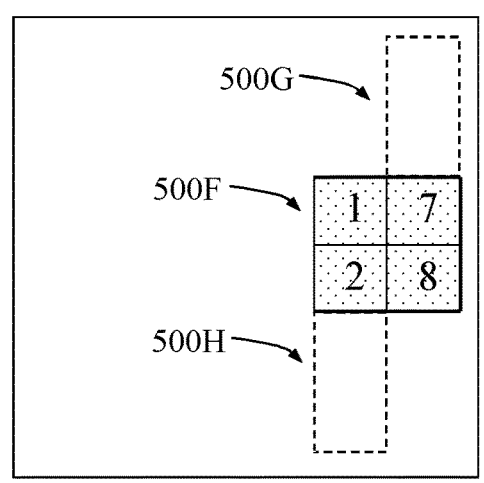

FIG. 5E illustrates that a first part of the predefined region 500E with resource elements 1-4 is assigned for data by predefined default and a second part of the predefined region 500E with resource elements 5-8 is zero-power (no data present) by predefined default. In that case, the indication may indicate measurement resources 500F partly covering both the first and second parts, in this case resource elements 1 and 2 in the first part and resource elements 7 and 8 in the second part. Thereby, the wireless device 202 may use the remaining resources 500G and 500H in the first and second parts according to said default.

For example, the wireless device 202 may then be indicated to perform a measurement on a CSI-MR partly covering both first and second part wherein the device 202 will assume the REs in the first part that are not covered by the indicated CSI-MR to be used for data while the REs in the second part that are not covered by the indicated CSI-MR to be blanked.

This may be beneficial e.g. if some resource elements are used for interference measurements, some resource elements need to be blanked due to power budget, while some resource elements are in need of blanking due to analogue beam-forming restrictions.

It was mentioned above that the wireless device 202 may be semi-statically configured with a predefined table of resource elements that might be CSI-MR. The resource elements specified in this table will thus effectively define the predefined region where CSI-MR could potentially be present. In one example, each index in the table refers to one resource element in the resource block and the resource elements can be enumerated as in the resource block depicted in FIG. 6A and the table depicted in FIG. 6B.

Figures 6A, 6B:
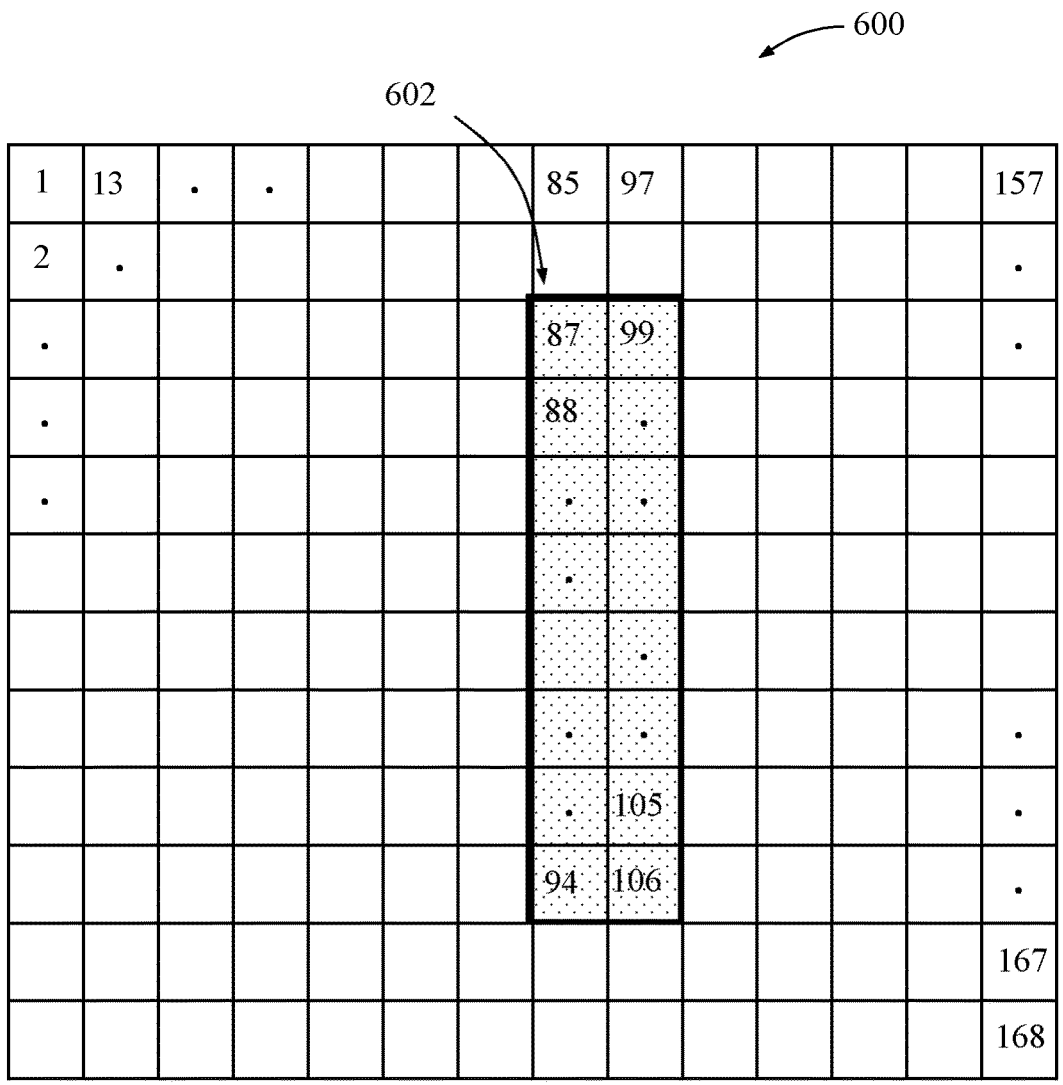
FIG. 6A is a diagram illustrating an example of how a predefined region may be located in a resource block, according to further possible embodiments.
FIG. 6B is a table illustrating an example of a compact mapping to the predefined region of FIG. 6A, according to further possible embodiments.

The resource block 600 is comprised of 12×14=168 resource elements in total which are numbered as shown in FIG. 6A. The predefined region 602 extends across resource elements 87-94 and resource elements 99-106, each resource element 87-94, 99-106 being encoded with a corresponding index 1-16 according to the table in FIG. 6B. This way, less information bits are required when signalling the indication of assigned usage of measurement resources as compared to using the original numbering of the resource elements 87-94, 99-106 in the predefined region 602.

In other examples, a predefined table may be used having different entries which may refer to a varying number of resource elements and hence make up a scrambled set of resource elements available for CSI-RS assignment. In one example, a semi-static configuration may, apart from this table, include the number n of entries in the table, e.g. n=2, which indicate how many measurement resources that can be used for channel measurements. Then the signalled indication can indicate the above-described start-entry s, e.g. s=4, such that the wireless device 202 can deduce that it should perform channel measurements on the resource elements {90,91} according to the table in FIG. 6B. Additionally, the signalled indication can indicate the above-described first end-entry e1 that represents up to which entry REs are allocated for all devices.

The above information can be used by the wireless device 202 to deduce where interference can be measured. The value of the first end-entry e1 may be common to all devices and it can be broadcasted to all the devices that share the CSI-RS resources, e.g., devices belonging to the same logical cell or network node 200. The first end-entry e1 should be greater than any indicated start-entry s plus the configured number n of entries where channel measurements can be performed. A second end-entry e2 can be indicated, which must be greater than the first end-entry e1, and e2 indicates up to which entry in the table the wireless device will not have any data allocated and therefore can safely disregard when decoding its own received data.

Figures 6C, 6D:
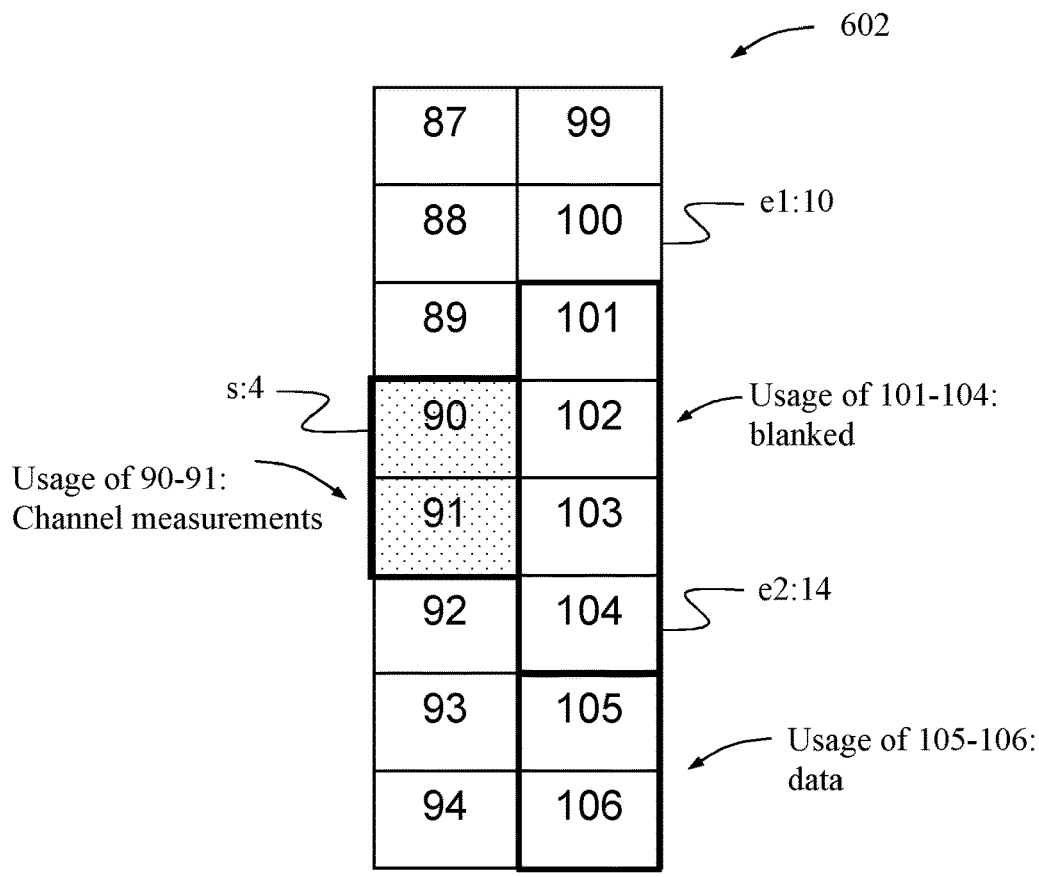
FIG. 6C is a diagram illustrating an example of how usage of the measurement resources may be assigned in the predefined region of FIG. 6A, according to further possible embodiments.
FIG. 6D is an example table with an indication of the usage in FIG. 6C, according to further possible embodiments.

An example of the combined indicators s, e1 and e2 is {s: 4, e1: 10, e2: 14}, which is illustrated in FIG. 6C which refers to the predefined region 602 in the resource block 600 as of FIG. 6A. This information can be used by the wireless device 202 to deduce that resource elements 90, 91 in the resource block 600 can be used for channel measurements. In another example, the signalled indication could also indicate the number of entries to perform channel measurement based on a predefined table, e.g. as shown in FIG. 6B. The combined indicators would then be {n:2, s:4, e1: 10, e2: 14} which may be signalled as shown in FIG. 6D.

Figure 7:
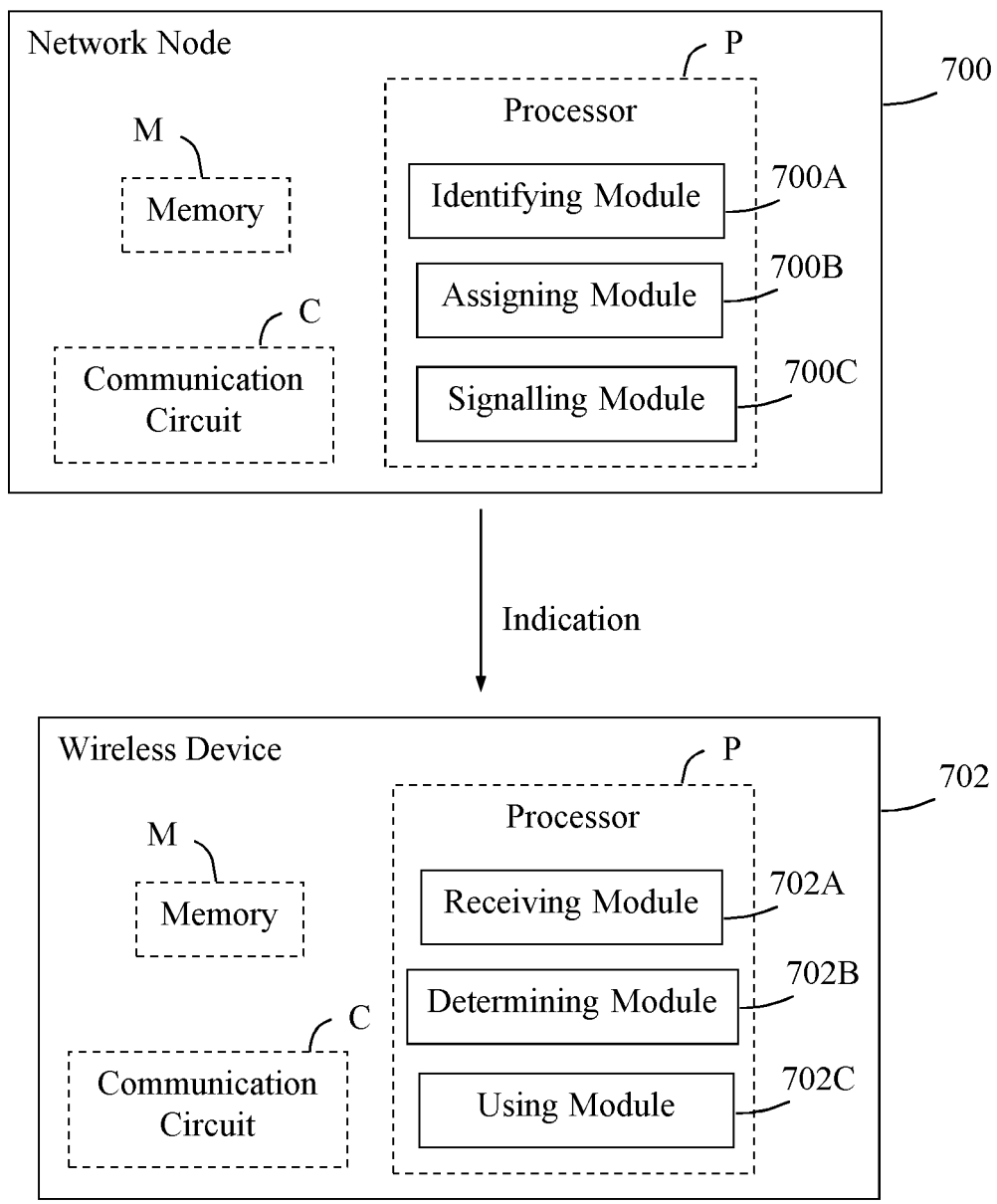
FIG. 7 is a block diagram illustrating a network node and a wireless device in more detail, according to further possible embodiments.

The block diagram in FIG. 7 illustrates a detailed but non-limiting example of how a network node 700 and a wireless device 702, respectively, may be structured to bring about the above-described solution and embodiments thereof. In this figure, the network node 700 and the wireless device 702 may be configured to operate according to any of the examples and embodiments of employing the solution as described above, where appropriate, and as follows. Each of the network node 700 and the wireless device 702 is shown to comprise a processor "P", a memory "M" and a communication circuit "C" with suitable equipment for transmitting and receiving messages in the manner described herein.

The communication circuit C in each of the network node 700 and the wireless device 702 thus comprises equipment configured for communication over a radio interface using a suitable protocol for the communication depending on the implementation. The solution is however not limited to any specific types of protocols.

The network node 700 comprises means, e.g. in the form of modules, units or the like, configured or arranged to perform at least some of the actions of the flow chart in FIG. 3 in the manner described herein. Further, the wireless device 702 comprises means, e.g. in the form of modules, units or the like, configured or arranged to perform the actions of the flow chart in FIG. 4 in the manner described above. These actions and procedures may be performed by means of functional modules in the respective processor P in the network node 700 and the wireless device 702 as follows.

The network node 700 is arranged to indicate assignment of measurement resources in a predefined region 602 of a resource block 600 transmitted by the network node 700. The network node 700 is configured to identify at least one wireless device 702 that is required to perform measurements on signals transmitted by the network node 700 and/or measurements of interference. This operation may be performed by an identifying module 700A in the network node 700, e.g. in the manner described for action 300.

The network node 700 is further configured to assign to the at least one identified wireless device 702 usage of the measurement resources in the predefined region. This operation may be performed by an assigning module 700B in the network node 700, e.g. in the manner described for action 302.

The network node 700 is also configured to signal an indication of the assigned usage of the measurement resources to the at least one wireless device 702, said indication specifying how the respective measurement resources should be used by the at least one wireless device 702. This operation may be performed by a signalling module 700C in the network node 700, e.g. in the manner described for action 304.

The wireless device 702 is arranged to handle assignment of measurement resources in a predefined region of a resource block transmitted by a network node 700 in a wireless network. The wireless device 702 is configured to receive from the network node 700 an indication of usage of measurement resources in the predefined region, said indication specifying how the respective measurement resources should be used by the wireless device. This operation may be performed by a receiving module 702A in the wireless device 702, e.g. as described above for action 400.

The wireless device 702 is further configured to determine the measurement resources based on the received indication. This operation may be performed by a determining module 702B in the wireless device 702, e.g. as described above for action 402. The determining module 702B could alternatively be named a logic module or activating module. The wireless device 702 is also configured to use the determined measurement resources as specified by the received indication of usage. This operation may be performed by a using module 702C in the wireless device 702, e.g. as described above for action 404.

It should be noted that FIG. 7 illustrates various functional modules in the network node 700 and the wireless device 702, respectively, and the skilled person is able to implement these functional modules in practice using suitable software and hardware. Thus, the solution is generally not limited to the shown structures of the network node 700 and the wireless device 702, and the functional modules therein may be configured to operate according to any of the features and embodiments described in this disclosure, where appropriate.

The functional modules 700A-C and 702A-C described above can be implemented in the network node 700 and the wireless device 702, respectively, by means of program modules of a respective computer program comprising code means which, when run by the processor P causes the network node 700 and the wireless device 702 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the network node 700 and the wireless device 702 in the form of a memory having a computer readable medium and being connected to the processor P. The computer program product or memory M in each of the network node 700 and the wireless device 702 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective network node 700 and wireless device 702.

The solution described herein may be implemented in each of the network node 700 and the wireless device 702 by a computer program comprising instructions which, when executed on at least one processor, cause the at least one processor to carry out the actions according to any of the above embodiments, where appropriate. The solution may also be implemented at each of the network node 700 and the wireless device 702 in a carrier containing the above computer program, wherein the carrier is one of an electronic signal, optical signal, radio signal, or computer readable storage medium.

Some further examples of how the solution may be employed in practice will now be described.

In one practical example, dynamic indication of interference measurement resource may be employed as follows.

A network node may have beamforming capabilities where the network node decides to transmit three beamformed CSI-RSs, e.g. 1, 2 and 3, corresponding to three beams on which three wireless devices can perform channel estimation. In this example, three CSI-MRs labeled 1, 2 and 3 are used (other CSI-MRs defined according to the configuration are assumed to be used for data). In a first assignment to a first wireless device, the assignment indicates

{CSI-RS: 1, CSI-IM: 2} which will instruct the first wireless device to perform channel estimation on a first CSI-MR and interference estimation on a second CSI-MR. This means that CSI estimated is with respect to experiencing interference from the second beam.

In a second assignment to the first wireless device, the assignment may indicate

{CSI-RS: 1, CSI-IM: 2,3} which will instruct the first wireless device to perform channel estimation on the first CSI-MR and interference estimation on the second and third CSI-MRs. This means that CSI estimated is with respect to having interference from both the second and third beams.

In another practical example, dynamic indication of port-dependent channel estimation may be employed as follows.

In this example the configuration is assumed to specify a CSI-MR for 4 ports, e.g. 4 resource elements per resource block is allocation for each CSI-MR. The CSI-MR may be labeled 1, 2, 3 . . . In a first assignment a UE may be assigned to perform an 8-port channel estimation as

{CSI-RS: 1,2, CSI-IM: . . . } and second assignment may be performed a 4-port channel estimation as

{CSI-RS: 2, CSI-IM: . . . }

While the solution has been described with reference to specific exemplifying embodiments, the description is generally only intended to illustrate the inventive concept and should not be taken as limiting the scope of the solution. For example, the terms "network node", "wireless device", "measurement resource", "resource block", "reference signal", "predefined region", "resource element" and "blanked" have been used throughout this disclosure, although any other corresponding entities, functions, and/or parameters could also be used having the features and characteristics described here. The solution is defined by the appended claims.

The invention claimed is:

1. A method performed by a network node of a wireless network, for indicating assignment of measurement resources in a predefined region of a resource block transmitted by the network node, the method comprising:
identifying at least one wireless device that is required to perform measurements on signals transmitted by the network node and/or measurements of interference,
dynamically assigning to the at least one identified wireless device usage of the measurement resources in the predefined region, and
signalling an indication of the dynamically assigned usage of the measurement resources to the at least one wireless device, said indication specifying how respective ones of the measurement resources are used by the at least one wireless device,
wherein the dynamic assigning of the usage of the measurement resources and the signalling of the indication is performed such that the usage of the measurement resources is valid for a limited number of transmitted resource blocks, wherein the dynamically assigning is changed on a per resource block basis depending on the at least one identified wireless device and the indication of the changed assigned usage is signalled from the network node to the at least one wireless device, and wherein the dynamically assigning indicates that the dynamically assigning has a certain time-validity.

2. The method according to claim 1, wherein the indication specifies that each respective measurement resource is used for at least one of: channel estimation, interference estimation, and data or zero-power.

3. The method according to claim 1, wherein a first part of the predefined region is assigned for data by predefined default, and a second part of the predefined region is zero-power by predefined default, and the indication indicates measurement resources partly covering both the first and second parts, wherein the remaining resources in the first and second parts are used according to said default.

4. A network node configured to indicate assignment of measurement resources in a predefined region of a resource block transmitted by the network node, wherein the network node comprises:
a communication circuit; and
a memory and a processor, wherein the memory stores instructions executable by the processor whereby the network node is configured to:
identify at least one wireless device that is required to perform measurements on signals transmitted by the network node and/or measurements of interference,
dynamically assign to the at least one identified wireless device usage of the measurement resources in the predefined region, and
signal an indication of the dynamically assigned usage of the measurement resources to the at least one wireless device, said indication specifying how the respective measurement resources are used by the at least one wireless device,
wherein the processor is further configured to dynamically assign the usage of the measurement resources and the indication is valid for a limited number of resource blocks transmitted by the network node, wherein the usage assigned from the network node is changed on a per resource block basis depending on the at least one identified wireless device and the indication of the changed assigned usage is signalled from the network node to the at least one wireless device, and wherein the processor configured to dynamically assign indicates that to dynamically assign has a certain time-validity.

5. The network node according to claim 4, wherein the indication specifies that each respective measurement resource is used for at least one of: channel estimation, interference estimation, and data or zero-power.

6. The network node according to claim 4, wherein a first part of the predefined region is assigned for data by predefined default, and a second part of the predefined region is zero-power by predefined default, and the indication indicates measurement resources partly covering both the first and second parts, wherein the remaining resources in the first and second parts are used according to said default.

7. A method performed by a wireless device, for handling assignment of measurement resources in a predefined region of a resource block transmitted by a network node in a wireless network, the method comprising:
- receiving from the network node an indication of a dynamically assigned usage of measurement resources in the predefined region, said indication specifying how the respective measurement resources are used by the wireless device, wherein the dynamically assigned usage of the measurement resources and the indication is valid for a limited number of resource blocks transmitted by the network node, and wherein the method further comprises receiving, by the wireless device, the indication indicating that the dynamically assigned usage from the network node has been changed on a per resource block basis depending on the wireless device;
- determining the measurement resources based on the received indication; and
- using the determined measurement resources as specified by the received indication of usage,
- wherein the indication indicating the dynamically assigned usage indicates that the dynamically assigned usage has a certain time-validity.

8. The method according to claim 7, wherein the received indication specifies that each respective measurement resource is used for at least one of: channel estimation, interference estimation, and data or zero-power.

9. The method according to claim 7, wherein the received indication comprises a mapping to individual resource elements in the predefined region.

10. The method according to claim 7, wherein a first part of the predefined region is assigned for data by predefined default, and a second part of the predefined region is zero-power by predefined default, and the received indication indicates measurement resources partly covering both the first and second parts, and wherein the wireless device uses the remaining resources in the first and second parts according to said default.

11. The method according to claim 7, wherein the received indication refers to entries in a predefined table where each entry is associated to one or more respective resource elements in the predefined region.

12. A wireless device configured to handle assignment of measurement resources in a predefined region of a resource block transmitted by a network node in a wireless network, wherein the wireless device comprises:
- a communication circuit; and
- a memory and a processor, wherein the memory stores instructions executable by the processor whereby the wireless device is configured to:
  - receive from the network node an indication of a dynamically assigned usage of measurement resources in the predefined region, said indication specifying how the respective measurement resources are used by the wireless device,
  - wherein the dynamically assigned usage of the measurement resources and the indication is valid for a limited number of resource blocks transmitted by the network node, and wherein the wireless device is further configured to receive from the network node the indication indicating that the dynamically assigned usage from the network node has been changed on a per resource block basis depending on the wireless device;
  - determine the measurement resources based on the received indication; and
  - use the determined measurement resources as specified by the received indication of usage,
- wherein the indication indicating the dynamically assigned usage indicates that the dynamically assigned usage has a certain time-validity.

13. The wireless device according to claim 12, wherein the received indication specifies that each respective measurement resource is used for at least one of: channel estimation, interference estimation, and data or zero-power.

14. The wireless device according to claim 12, wherein the received indication comprises a mapping to individual resource elements in the predefined region.

15. The wireless device according to claim 12, wherein a first part of the predefined region is assigned for data by predefined default, and a second part of the predefined region is zero-power by predefined default, and the received indication indicates measurement resources partly covering both the first and second parts, and wherein the wireless device is configured to use the remaining resources in the first and second parts according to said default.

16. The wireless device according to claim 12, wherein the received indication refers to entries in a predefined table where each entry is associated to one or more respective resource elements in the predefined region.

* * * * *